United States Patent
Lazar et al.

(10) Patent No.: US 9,785,712 B1
(45) Date of Patent: Oct. 10, 2017

(54) MULTI-INDEX SEARCH ENGINES

(71) Applicant: Amazon Technologies, Inc., Reno, NV (US)

(72) Inventors: Anthony Salim Lazar, Seattle, WA (US); Christopher Philip Jordan, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 359 days.

(21) Appl. No.: 14/310,409

(22) Filed: Jun. 20, 2014

(51) Int. Cl.
*G06F 17/30* (2006.01)

(52) U.S. Cl.
CPC .... *G06F 17/30864* (2013.01); *G06F 17/3053* (2013.01); *G06F 17/30336* (2013.01); *G06F 17/30528* (2013.01); *G06F 17/30619* (2013.01); *G06F 17/30946* (2013.01)

(58) Field of Classification Search
CPC .......... G06F 17/3053; G06F 17/30867; G06F 17/3064; G06F 17/30321; G06F 17/3002; G06F 17/30705; G06F 17/2785; G06F 17/30613; G06F 17/30861; G06F 17/30477; G06F 17/30554; G06F 17/30598; G06F 17/30864; G06F 17/30917; G06F 17/30424
USPC .................................................. 707/705–780
See application file for complete search history.

(56) References Cited

U.S. PATENT DOCUMENTS

| | | | | |
|---|---|---|---|---|
| 7,958,171 | B1* | 6/2011 | Genser | G06F 17/30696 345/619 |
| 9,015,167 | B1* | 4/2015 | Ballou | G06F 17/30321 707/741 |
| 2006/0248039 | A1* | 11/2006 | Brooks | G06F 17/30613 |
| 2009/0094186 | A1* | 4/2009 | Kan | G06F 17/30321 |
| 2010/0114950 | A1* | 5/2010 | Raichur | G06F 17/30864 707/770 |
| 2011/0320458 | A1* | 12/2011 | Karana | G06F 17/30286 707/741 |
| 2012/0173511 | A1* | 7/2012 | Eto | G06F 17/301 707/711 |
| 2013/0080460 | A1* | 3/2013 | Tomko | G06F 17/30864 707/767 |
| 2013/0326406 | A1* | 12/2013 | Reiley | G06F 3/048 715/810 |
| 2014/0074851 | A1* | 3/2014 | Zhang | G06Q 30/0201 707/741 |
| 2016/0253423 | A1* | 9/2016 | Rolia | G06F 17/30557 |

* cited by examiner

*Primary Examiner* — Michelle Owyang
(74) *Attorney, Agent, or Firm* — Kilpatrick Townsend & Stockton LLP

(57) ABSTRACT

Systems and methods for performing multi-index searches are described in which a search string may be received, and processed by first running the query through a general search index, such as an Internet or e-commerce search. The results of the general search may then be analyzed to determine an appropriate context for the search query, e.g. clothing, sports, games, etc. The search query may then be processed using a second search index that is tuned to the specific context of the search query. After obtaining the results to the second search, the second search index and/or ranking algorithms may be modified to improve future search results having a similar context.

20 Claims, 6 Drawing Sheets

MULTI-INDEX SEARCH ENGINES

BACKGROUND

Search engines are often assessed based on two metrics: recall and precision. Recall is the ratio between the number of relevant results returned and the total number that exist in the collection being searched. Precision is the ratio between the number of relevant results returned and the size of the result set returned by the search. Typically, search engines rely on large-scale indexes which include an entire collection of data and are very time consuming to create and maintain. Moreover, optimizing such search engines to perform well in one respect (e.g. to return relevant results to boost precision) can easily impact the other (e.g. fewer results are returned, including relevant ones, thus lowering recall).

BRIEF DESCRIPTION OF THE DRAWINGS

Various embodiments in accordance with the present disclosure will be described with reference to the drawings, in which.

DETAILED DESCRIPTION

Figure 1:
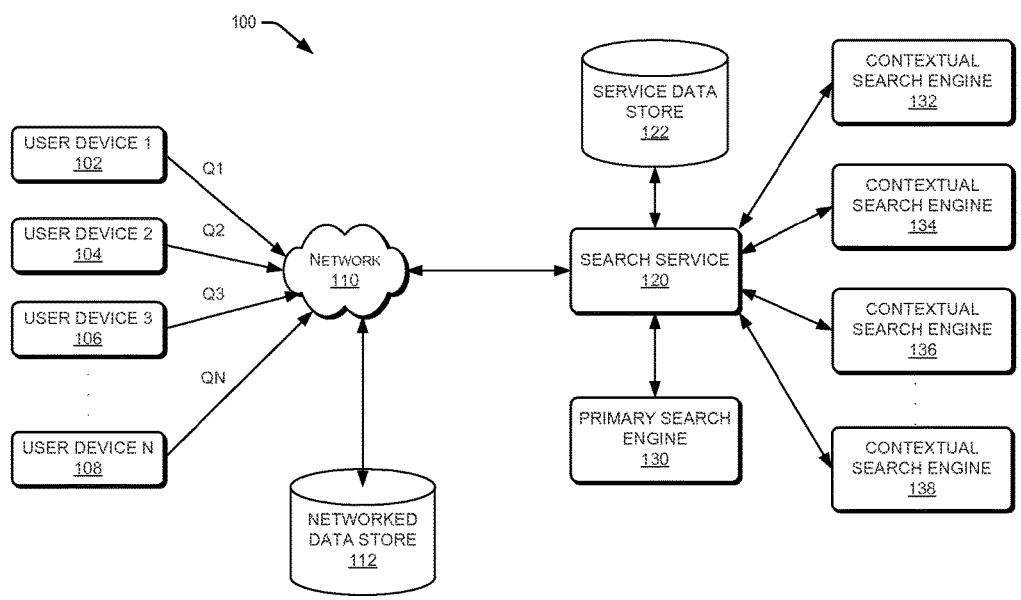
FIG. 1 illustrates a network environment including a multi-index search engine, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to certain aspects of the disclosure, a search query may be received, and processed by first running the query through a general search index, such as an Internet or e-commerce search index. The results of the general search may then be analyzed to determine an appropriate context for the search query, e.g. clothing, sports, games, etc. The search query may then be processed using a second search index that is tuned to the specific context of the search query. After obtaining the results to the second search, the second search index and/or ranking algorithms may be modified to improve future search results having a similar context.

As described further herein, a search query may include, for example, a text string, image data, video data, and/or audio data. In some examples, such search queries may be processed by a first search index that is used to search a first data set (e.g. a particular database or designated portion thereof) to obtain a first set of search results, typically including a subset of the first data set. The first search index may be configured to perform general, non-contextual, searches of a relatively large corpus of information, and may be relatively stable (e.g., modified relatively infrequently).

In some examples, the search results obtained using the first search index may be used, at least in part, to determine a second search index (e.g. from among a plurality of indices). For example, a context such as "boots" may be determined based at least in part on the first search results including a number of boot-like products, and a second search index that is tuned to the context of "boots" may then be used to further process the search query in order to identify a more relevant subset of the information objects returned in the first results. The context determination may be made based on an analysis of all or part of the first search results, as well as other information, such as search-term identifiers, various weighting factors, user-related parameters, metadata included in the search query, information associated with a user submitting the search query, seasonal data, etc. Such other information may be beneficial, for example, in assisting with contextual determination for a set of search results that may suggest one context under certain circumstances and another context under other circumstances. Referring back to the previous example, the "boots" context may be determined based on the first search results including a number of shoe-like products, along with additional word-association, seasonal or user-related geographic information that suggests the user may actually be searching for boots (e.g. the search query may include a boot-associated word like "shank," or the search may be submitted during winter time, in a mountainous local area, etc.).

In some examples, second search results may be obtained (e.g. from among the first search results) by processing the search query using the second search index, which may be a lightweight search index that may be tuned to specific types of information or items associated with the relevant context, and that may be adjusted on a more frequent basis than the first search index. For example, the first search index may typically be a large-scale index, with access to a vast array of documents, whereas each of various second indices may be smaller-scale indices that may be more readily and regularly modified without negatively affecting the system performance.

The second search results may also be analyzed and used, for example, to modify (or tune) a context-determining algorithm, the second search index and/or a ranking algorithm associated with the second search index, such as by performing historical analysis of search results obtained using the second search index and/or applying machine learning or other techniques to context, search and/or ranking algorithms associated with the second search index (e.g. by adjusting various weighting factors, word or other data identifiers, etc.) Such modifications may also be based on information that is independent of the second search results. Thus, subsequent queries may be contextualized and/or processed using the modified algorithms and/or search indices.

In some examples, the second search results may include document identifiers, and the analysis of the second search results may include analyzing content of documents associated with the document identifiers. For example, the second search index may include identifiers and/or address information necessary to access documents on a network, and the documents themselves can be retrieved as part of the analysis. In some examples, the search indices may be configured to routinely update information from documents included in the index, such that modifications of the context-determining algorithm, the second search index and/or the ranking algorithm may be performed independently from specific searches.

According to further aspects of the disclosure, searches may be performed in the context of a web service, such as a web search engine, an electronic or virtual storefront accessible by customers to search for, order, and/or purchase items or services, cloud storage, etc. As used herein, web services should be broadly understood as applying to various public and/or private network services (e.g., the Internet) including, for example, distributed databases, cloud storage, e-commerce, publishing, or similar services supported by network and/or web-based storage. In some examples, a given web service may be associated with a particular webstore or virtual storefront for a particular merchant.

In some examples, a web service such as a website, a virtual storefront, a webstore, etc., may be provided for various merchants or tenants as part of an electronic marketplace, and may be managed by one or more service provider computers (e.g., servers) that host electronic content in the form of, for example, an electronic catalog, with or without associated purchase and billing functionality. Customers may access the web service, e.g., a virtual storefront, to search for, view, review, discuss, order, and/or purchase items (e.g., physical items or services) from the web service.

In some examples, a web service, such as a cloud storage service, may be provided to various entities/tenants including, educational, government, corporate or individual customers, and may be managed by one or more service provider computers (e.g., servers) that provide web portals, APIs and the like, through which the customers can search, upload, modify and/or retrieve data or executables to, or from, remote databases.

The techniques described above and below may be implemented in a number of ways and in a number of contexts. Several example implementations and contexts are provided with reference to the following figures, as described below in more detail. However, the following implementations and contexts are but a few of many.

Turning to FIG. 1, an example of a network environment including a multi-index search service 120, according to aspects of the disclosure, is provided. As shown in FIG. 1, the search service 120 may be accessed by a plurality of user devices 102, 104, 106, 108 via a network 100, such as the Internet. Any number of network-accessible data store(s) 112 or other resources, such as web pages, etc., may also be available to the user devices 102, 104, 106, 108 and the search service 120 via network 110.

The search service 120 may be managed by a service provider, e.g. a dedicated Internet search site, a hybrid search and service site, such as an e-commerce site, etc., and may be implemented using one or more servers under the management or control of the service provider.

The service provider may provide an electronic marketplace, or other web service, that includes myriad product listings, or other information objects, and may host multiple tenants. In some examples, the search service 122 may be integrated with its own data store 122, access to which is managed by the service provider, and may provide shared and/or dedicated databases including the listings or other information objects for different merchants or other users of the web service.

Search service 120 may include a primary search engine 130 that is used to process non-contextualized search queries received from the user devices 102, 104, 106 and 108. Primary search engine 130 may be, for example, a generic search algorithm, tuned to work efficiently on hundreds of millions of information objects (for web search engines), or millions of objects (for large scale e-commerce or other storage searches). In some examples, the primary search engine 130 may be configured to operate on a data set that represents the entire corpus of information objects that the search service 120 has access to, e.g. a service proprietary storage or other resources such as web pages. This may include, for example, a massive index that includes identifiers and/or access information for all of the accessible information objects.

As such, searches processed by the primary search engine 130 may be expected to return a large number of results (i.e. high recall), but have a relatively low precision. That is, the ranking of the results provided by the primary search engine (if any) may not optimize the results for what the user is actually looking for. In some examples, the primary search engine 130 may be streamlined so as not to include a ranking algorithm to rank the first results. Rather, the primary search engine 130 may rely on the contextual search engines to perform all ranking functions. Therefore, in some examples, search queries may be processed using a secondary search engine that is more specifically tuned to the context of the query.

Search service 120 may also include any number of secondary (or "contextual") search engines 132, 134, 136 and 138 that are used to process contextualized search queries. Contextual search engines 132, 134, 136 and 138 can be built and rebuilt relatively quickly, and may be tuned frequently (e.g. every certain number of searches, on a scheduled or as needed basis, etc.) to maintain the most relevant search results related to an associated query context.

In some examples, each of contextual search engines 132, 134, 136 and 138 may include a ranking algorithm that is configured (or tuned) to more appropriately rank search results for queries that are associated with a given context. For example, each of the contextual search engines 132, 134, 136 and 138 may be associated with one or more context identifiers that help associate search queries with an appropriate secondary search engine.

Each of the contextual search engines 132, 134, 136 and 138 may also include its own search index, which may include all results that have been generated by searches within the associated context(s) for that search engine.

The relatively "lightweight" indices included in contextual search engines 132, 134, 136 and 138 are easily modified and assist with the efficient ranking order provided by the predetermined ranking algorithm associated with a given search engine. It should be appreciated that each of these ranking algorithms may be more easily and/or fully tailored compared to the generic index included in primary search engine 130. In some examples, one or more of contextual search engines 132, 134, 136 and 138 may be tuned to specific groups, merchants and/or individual users.

In some examples, contextual search engines 132, 134, 136 and 138 may be limited to a subset of the corpus of information objects generally accessible by the search service 120, e.g. limited to results provided by the primary search engine for a particular query and/or limited to a finite index that is smaller than the index for the primary search engine 130.

In general, each of the primary and contextual search engines may return a list of documents that are responsive to a given query. Indices may be built in each of the search engines, in which documents or other information objects get a unique ID that can be used, for example, to link a web page or other networked resource.

In some examples, one or more of the search engines and/or search service 120 may be configured to access document (or other object) content, e.g. to assist in the analysis of search results. For example, contextual search engine 132 may access document content to assist in ranking the relevancy of the search results, and may apply contextual rules during the analysis of the content.

As discussed further herein, in some examples, all search queries received by the search service 120 may be processed by the primary search engine 130 before attempting to contextualize the search query, e.g. by analyzing the results obtained by the primary search engine and/or other information. In other examples, an attempt to contextualize the search queries may be made prior to processing them by the primary search engine 130. In those instances, search queries that can be contextualized independently may be processed via one or more of the contextual search engines 132, 134, 136 and 138 without having been processed by the primary search engine 130, whereas search queries that cannot be contextualized independently may be processed via the primary search engine 130, and contextualized (if possible) after obtaining those search results.

As discussed further herein, in some examples, results obtained by the primary search engine 130 may be subsequently searched by one or more of the contextual search engines 132, 134, 136 and 138 to obtain second search results. Any of primary search engine 130 and contextual search engines 132, 134, 136 and 138 may include different ranking algorithms that are used to rank search results.

According to aspects of the disclosure, lighter-weight indexes can be created to provide lookup values for terms that can be based on qualities of the corpus, such as term discrimination or heuristics, seasonality for clothing types and/or brands, etc. While a generic search engine can be tuned independently based on re-ranking results, e.g. so that the results sets it returns have higher precision and/or recall, such updates can be quite costly and often times have to be done at regular intervals. The lighter-weight indices provided in the contextual search engines can be updated more frequently because they contain a smaller subset of the documents stored in the primary search index and therefore are less time consuming to build. That allows these types of indices to be more current based on more up to date trends and/or data, which can lead to better ranking of search results. Post hoc ranking can be used to reorder a results set, so that the most relevant results appear above less relevant ones, both of which appear before irrelevant results, without impacting recall.

By way of further example, different queries may have different relevancy ranking formulas based on the type of query or the context of the query. Contextual indices may allow for the same search engine to be used to return results for all queries, as afterwards relevancy re-ranking can be done specific to the query type or context. For example, a query including "red skirt" may have different search results rankings if the context is "clothing" versus "bedding". Such context may be determined in various ways including analysis of the query itself, analysis of data associated with a requesting user and/or results of an initial search using the search query.

In some examples, various metadata may be used to influence re-ranking, which may be independent of search engine relevancy. Several results may all satisfy a search query equally well, but the metadata may be used to rank one above another. For example, the query "red skirt" mentioned above may have two results that both satisfy the query equally well, however one skirt may be ranked above another based on its age, so that newer results are returned above older results. Other examples of metadata that may be beneficially used include popularity indicators, reviews, sponsored content, etc.

As noted, in the example shown in FIG. 1, the search service 120 and data store 122 are not limited to supporting an electronic marketplace, and may be configured to search and support, for example, various web-based, or other networked, operations such as cloud storage, streaming services, service support, etc., for users. At least some of the users of the search service 120 may be assigned a profile by the service provider including various parameters that may be used to process search queries as discussed further herein. Exemplary implementations of an electronic marketplace in accordance with at least one embodiment is described below in more detail with reference to FIGS. 4 and 5.

In architecture 100, one or more users (i.e., electronic marketplace consumers or web browser users) may utilize a browser application or other web application on the user computing devices 102, 104, 106 and 108 to interact with search service 120, described above. As an example, users may interact with the search service 120 to search for, browse for, or purchase items from an electronic marketplace or to search for and access other information objects.

As described herein, an item may include a physical item of manufacture, a media item, a digital item (e.g., music, movie or software), and/or a service (e.g., a virtual computer that provides specific services to users) or other items for purchase or selection via a networked environment. In accordance with at least one embodiment, the electronic marketplace 112 may be configured to perform one or more operations to receive one or more queries Q1, Q2, Q3 . . . Qn issued by one or more users on user computing devices 102, 104, 106 and 108. In some examples, the service data store 122 may maintain search histories, browsing histories and/or item purchase histories of users of the search service 120, and such records may be used to tune contextual search engines for the specific users or for other users. For example, a user's actual selections from among search results responsive to a query may be used to further contextualize subsequent similar search queries, and/or refine a ranking algorithm.

Figure 2:
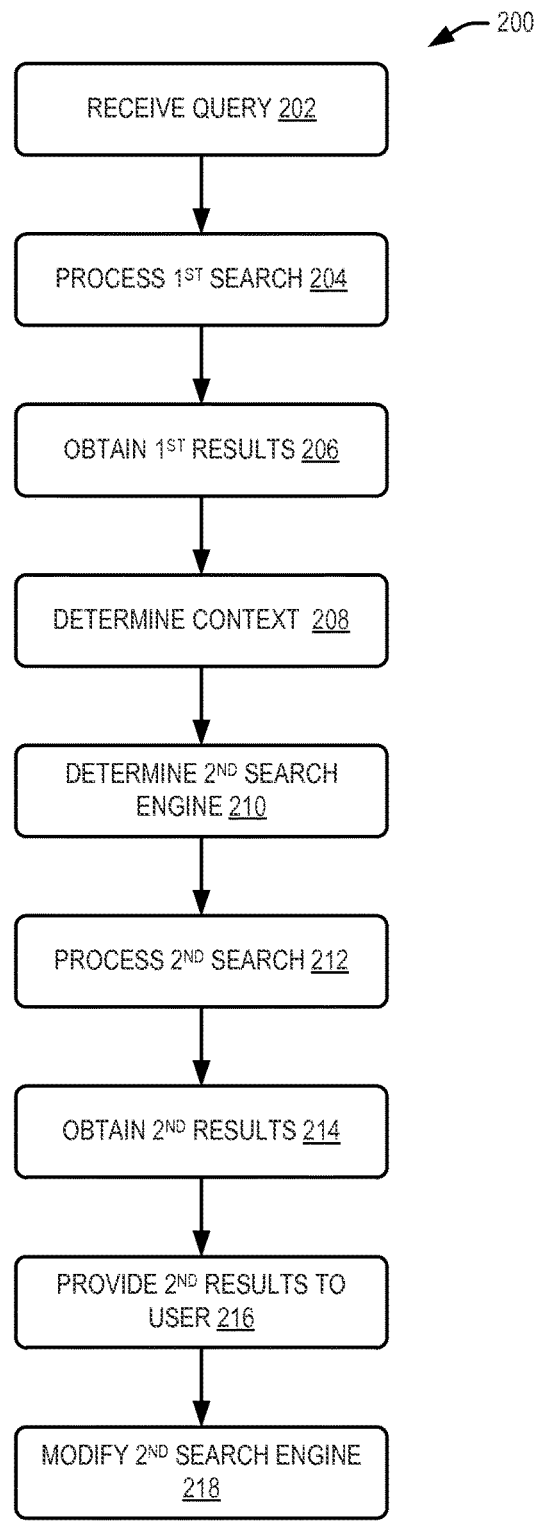
FIG. 2 is a flow diagram depicting an example process including steps for performing a multi-index search, according to at least one example.
Figure 3:
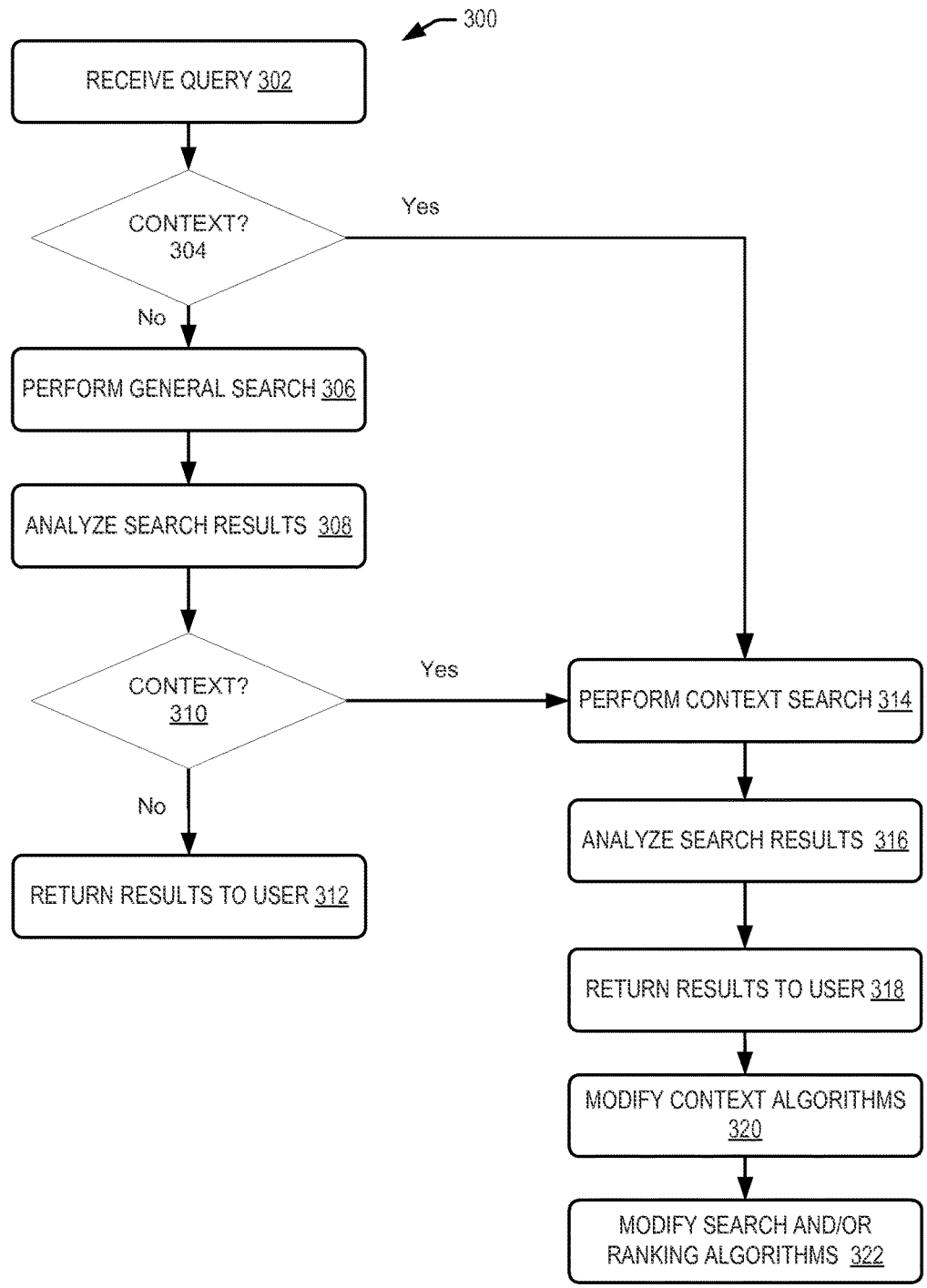
FIG. 3 is a flow diagram depicting another example process including steps for performing a multi-index search, according to at least one other example.
Figure 4:
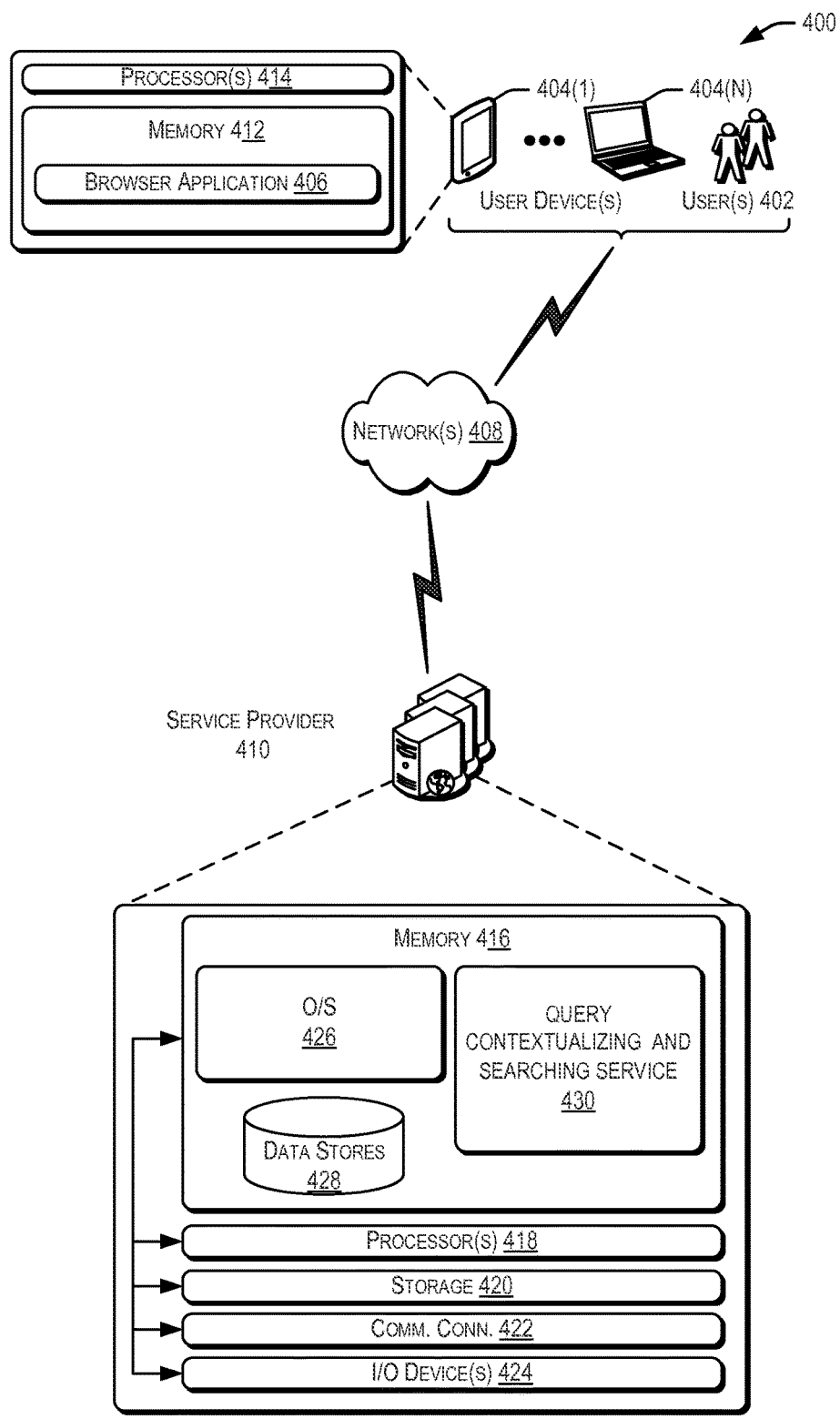
FIG. 4 illustrates an example architecture for implementing a query contextualizing and searching service described herein, according to at least one other example.

FIGS. 2-4 illustrate example flow diagrams showing respective processes 200, 300 and 400 for implementing processes as described herein. These processes are illustrated as logical flow diagrams, each operation of which may represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

Some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 2 depicts an illustrative flow 200 in which techniques for processing a search query using a multi-index search engine may be implemented. In illustrative flow 200, operations may be performed by one or more processors of one or more service provider computers and/or instructions for performing the operations may be stored in one or more memories of the service provider computers.

The flow 200 may begin at 202, in which a query is received by the search service, such as search service 120 in FIG. 1. The search query may include any information that is typically known in the art, e.g. text or other data objects, as well as metadata associated with, for example, the requesting user, a web address, a geographic region, time-stamp information, etc.

The flow 200 may optionally continue with 204, in which the query is processed by a first search engine, such as the primary search engine 130 in FIG. 1. This may include, for example, searching an entire corpus of information objects that the search service has access to, or some other relatively large-scale data store, etc. Generic search algorithms are known in the art and are not discussed in detail herein. However, it should be noted that, in some examples, the first search engine may be configured without a specific ranking algorithm since, as mentioned previously, the search service may rely on one or more secondary search engines to provide the ranking of results.

The flow 200 may optionally continue with 206, in which the results of the first search are obtained. This may include, for example, a relatively large number of results, which may be identified (internally) by document ID, or similar manner. In some examples, the first search results may not be provided to the user. Instead, the flow 200 may optionally continue with 208, in which a context of the search query may be determined. This may be done, for example, by applying a context-determining algorithm to one or more of information included in the search query, metadata associated with the search query, requesting user information, previous search results for related searches, and/or the first search results for the search query.

Context may be understood as an associative identifier for a subset of the entire corpus. These subsets partition the corpus into (potentially non-disjoint) mini-corpora with each subset containing documents that are all related in some way. In some examples, the subsets (and their corresponding indices) may be determined prior to query time, or the relevant subset(s) may be dynamically generated at query time.

Examples of context identifiers that may be associated with a search query may include classifications of the query (e.g. text, image, audio), product type (e.g. shoes, shirts, hats), sports & leisure activities (e.g. skiing, SCUBA, lacrosse), artists, authors, educational topics, projects, cooking, or any number of identifiers that may be determined, over time, to assist with the ranking of similar searches. As discussed further herein, each of such contexts may have unique search and ranking algorithms that assist in increasing the relevance of the search results returned to the user.

In analyzing the first search query and/or the search results, exemplary factors that may be considered include the frequency of a given word occurring in the overall corpus, the uniqueness of a word (e.g. skirt, shoes, mincemeat, etc.).

Other data not associated with the specific search terms or results may include, for example, other data associated with the user, seasonality data, crowdsource and/or social media data, etc.

In some examples, context analysis may include altering search terms based on seasonal or other non-search related information. For example, a search query for "shoes" might be contextualized to "boots" during the winter or based on a known temperature in geographic region, whereas the same search term "shoes" may be contextualized as "sandals" in the summer or based on a user's previous purchase of sandals when they searched for "shoes."

In some examples, more than one context may be identified as a potentially suitable match. Therefore, one processing technique may include choosing a "best fit" from among the possibilities, whereas other processing techniques may allow for more than one context to be associated with a given query. In the latter case, the search query may be processed by multiple contextual search engines and combined results returned, or a best fit may be determined after running the plurality of contextual searches. In some instances, the best fit may be determined based on weighting factors associated with, for example, what application the search is being submitted on, e.g. a general web search vs. a shopping engine, aggregated user information, crowdsource data, individual user data, etc.

The flow 200 may optionally continue with 210, in which a second search engine is identified based on the context assigned in 208. For example, one of contextual search engines 132, 134, 136 or 138 may be associated with the assigned context, and therefore will be assigned for the second search for the query.

In some examples, a plurality of preconfigured contextual search engines may be available that can provide an "out of the box" results and ranking, before the system further refines the contextual search engines. One way of testing the system would be to run multiple contextual searches for a given query and assess the relevancy of the different results, which could then be used to assist in the contextualization of similar searches going forward.

The flow 200 may optionally continue with 212, in which the second search is processed using the second search engine identified in 210. In some examples, this may include searching only the results of the first search from 206, which can greatly reduce the processing requirements of the second search. This may be achieved, for example, by the second search engine maintaining an index that includes the identifiers for all information objects that can be returned as results by the first search engine for the given context.

The flow 200 may optionally continue with 214, in which the results of the second search may be obtained. This may involve processing the first search results using the second search engine, as well as applying a ranking algorithm that is tailored to the context associated with the second search engine. It should be noted that the factors used by the second or other contextual algorithms need not be different than those used in current search ranking algorithms. However, according to aspects of the invention, the search and ranking algorithms used by contextual searches may be tuned for the specific subset of the corpus that each index contains.

The flow 200 may optionally continue with 216, in which the second search results are provided to a requesting user, e.g. via a web browser or specific application.

The flow 200 may optionally continue with 218, in which the system may automatically modify the second search engine and/or ranking algorithm based on, for example, an analysis of the second search results, user selection and/or purchase of items included in the search results, or aggregated user actions related to similar search results.

Additional details regarding possible steps that may be implemented in a multi-index search service are discussed further below with reference to FIG. 3. In illustrative flow 300, operations may be performed by one or more processors of one or more service provider computers and/or instructions for performing the operations may be stored in one or more memories of the service provider computers.

The flow 300 may begin at 302, in which a query is received by the search service, such as search service 120 in FIG. 1. The search query may include any information that is typically known in the art, e.g. text or other data objects, as well as metadata associated with, for example, the requesting user, a web address, a geographic region, timestamp information, etc.

The flow 300 may optionally continue with 304, in which a determination is made regarding whether a context for the search query can be determined independently, i.e. without performing the first, general, search. In some cases, a context may be determined solely based on the search terms, e.g. if they are sufficiently unique to limit them to a specific context, or additional data may be analyzed such as user history information, metadata included with the query, etc. If a context cannot be determined, the method may continue with 306, in which the query is processed by a first search engine, such as the primary search engine 130 in FIG. 1. As mentioned above, this may include, for example, searching an entire corpus of information objects that the search service has access to, or some other relatively large-scale data store, etc.

The flow 300 may optionally continue with 308, in which the results of the first search are analyzed, e.g. to attempt to determine a context for the search query based on the first search results (with or without additional information).

The flow 300 may continue with 310, in which a determination is made regarding whether a context for the search query can now be determined, i.e. based on consideration of the first search results and any other available information.

If a context cannot be determined in 310, the method may continue with 312, in which the search results obtained by the first search engine may be returned to the requesting user.

If a context of the search query is determined in either of 304 or 310, the flow may continue with 314, in which a second search engine is identified based on the context assigned in 304 or 310 and a contextual search is performed. In some examples (e.g. when no context is identified in 304), this may include searching only the results of the first search from 306, which can greatly reduce the processing requirements of the second search. This may be achieved, for example, by the second search engine maintaining an index that includes the identifiers for all information objects that can be returned as results by the first search engine for the given context. In other examples (such as when a context is identified in 304), the contextual search in 314 may be self-limiting based on the lightweight (i.e. non-comprehensive) index associated with the particular contextual search engine. The results may also be ranked according to a ranking algorithm associated with the contextual search engine.

The flow 300 may optionally continue with 316, in which the contextual search results may be analyzed, e.g. to modify the results provided to the user in 318 and/or to modify any of the context, search and/or ranking algorithms in 320 and 322.

The flow 300 may optionally continue with 318, in which the contextual search results are provided to a requesting user, e.g. via a web browser or specific application.

The flow 300 may optionally continue with 320, in which the system may automatically modify one or more contextual algorithms used in 304 and/or 310 based on, for example, the analysis of the second search results, user selection and/or purchase of items included in the search results, or aggregated user actions related to similar search results.

The flow 300 may optionally continue with 322, in which the system may automatically modify the second search engine and/or ranking algorithm based on, for example, an analysis of the second search results, user selection and/or purchase of items included in the search results, or aggregated user actions related to similar search results. [

It should be noted that, although described at least partially in the context of text-based searches, aspects of the present subject matter may also find applicability in searches including image, video, audio or other multimedia data. For example, search queries described herein may include embedded, or referenced, image, video and/or audio files that may be used as a basis for identifying other relevant information objects (with or without such multimedia data) using appropriate search algorithms (e.g. facial recognition, audio matching, etc.).

FIG. 4 depicts an illustrative system or architecture 400 that depicts aspects of searching system applied in an electronic marketplace, as described herein. In architecture 400, one or more users 402 (i.e., electronic marketplace consumers or web browser users) may utilize user computing devices 404(1)-(N) (collectively, user devices 404) to access a browser application 406 (e.g., a web browser) or a user interface accessible through the browser application 406 via one or more networks 408.

In some aspects, the browser application 406 may be configured to receive, store and/or display a website including search functionality (e.g., an electronic marketplace website), or other interface on a display screen of the user devices 404. In accordance with at least one embodiment, in addition to accessing the browser application 406 to view the electronic marketplace website, the users 402 may also utilize one or more native applications (e.g., a software application program) developed for use on a particular platform compatible with the user devices 404 to access and/or search the electronic marketplace or other web service such as social media sites including text, images, videos and/or audio data. The one or more service provider computers 410 may, in some examples, provide computing resources such as, but not limited to, data storage, data access, management, virtualization, cloud-based software solutions, electronic content performance management, and the like. The one or more service provider computers 410 may also be operable to provide web hosting, computer application development and/or implementation platforms, combinations of the foregoing, or the like to the one or more users 402.

In some examples, the networks 408 may include any one or a combination of many different types of networks, such as cable networks, the Internet, wireless networks, cellular networks and other private and/or public networks. While the illustrated example represents the users 402 accessing the browser application 406 over the networks 408, the described techniques may equally apply in instances where the users 402 interact with the service provider computers 410 via the one or more user devices 404 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 406 may allow the users 402 to interact with the service provider computers 410 (e.g., via the electronic marketplace website), such as to search for, browse for or purchase items offered by the electronic marketplace, described herein. The one or more service provider computers 410, perhaps arranged in a cluster of servers or as a server farm, may host the electronic marketplace website and/or cloud-based software services. Other server architectures may also be used to host the electronic marketplace website and/or cloud-based software services. The browser application 406 may be capable of handling requests from many users 402 and serving, in response, various user interfaces that can be rendered at the user devices. In one example, the browser application 406 may be capable of receiving search queries from one or more users 404, and in response to the search queries, render network content (e.g., a web page) that includes hypertext information (e.g., information formatted in accordance with a hypertext markup language such as HTML) about an item listed (e.g., offered for sale) in an electronic marketplace system. The browser application 406 can also provide any type of website that supports user interaction, including search engine sites. The described techniques may similarly be implemented outside of the browser application 406, such as with other applications running on the user devices 404.

The user devices 404 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 404 may be in communication with the service provider computers 410 via the networks 408, or via other network connections. Additionally, the user devices 404 may be part of the distributed system managed by, controlled by, or otherwise part of the service provider computers 410.

In one illustrative configuration, the user devices 404 may include at least one memory 412 and one or more processing units (or processor(s)) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described.

The memory 412 may store program instructions that are loadable and executable on the processor(s) 414, as well as data generated during the execution of these programs. Depending on the configuration and type of user device 404, the memory 412 may be volatile (such as random access memory (RAM)) and/or non-volatile (such as read-only memory (ROM), flash memory, etc.). The user device 404 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 412 may include multiple different types of memory, such as static random access memory (SRAM), dynamic random access memory (DRAM), or ROM.

Turning to the contents of the memory 412 in more detail, the memory 412 may include an operating system and one or more application programs, modules, or services for implementing the features disclosed herein, such as via the browser application 406 or dedicated applications (e.g., smart phone applications, tablet applications, etc.). The browser application 406 may be configured to receive, store and/or display a website (e.g., the electronic marketplace website), or other interface for interacting with the service provider computers 410. In accordance with at least one embodiment, the browser application 406 may receive search queries submitted by the users 402 and provide the search queries to the service provider computers 410. Additionally, the memory 412 may store access credentials and/or other user information such as, but not limited to, user IDs, passwords and/or other user information.

In some aspects, the service provider computers 410 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 410 may be in communication with the user devices 404 and/or other service providers via the networks 408, or via other network connections. The service provider computers 410 may include one or more servers, perhaps arranged in a cluster, as a server farm, or as individual servers not associated with one item detail page rating service described herein as part of an integrated, distributed computing environment.

In one illustrative configuration, the service provider computers 410 may include at least one memory 416 and one or more processing units (or processor(s)) 418. The processor(s) 418 may be implemented as appropriate in hardware, computer-executable instructions, firmware, or combinations thereof. Computer-executable instruction or firmware implementations of the processor(s) 418 may include computer-executable or machine-executable instructions written in any suitable programming language to perform the various functions described.

The memory 416 may store program instructions that are loadable and executable on the processor(s) 418, as well as data generated during the execution of these programs. Depending on the configuration and type of service provider computers 410, the memory 416 may be volatile (such as RAM) and/or non-volatile (such as ROM, flash memory, etc.). The service provider computers 410 or servers may also include additional storage 420, which may include removable storage and/or non-removable storage. The additional storage 420 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 416 may include multiple different types of memory, such as SRAM, DRAM, or ROM.

The memory 416, the additional storage 420, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 416 and the additional storage 420 are all examples of computer storage media. Additional types of computer storage media that may be present in the service provider computers 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 410 may also contain communications connection(s) 422 that allow the service provider computers 410 to communicate with a stored database, another computing device or server, user terminals and/or other devices on the networks 408. The service provider computers 410 may also include I/O device(s) 424, such as a keyboard, a mouse, a pen, a voice input device, a touch input device, a display, speakers, a printer, etc.

Turning to the contents of the memory 416 in more detail and will be described in further detail in FIG. 5, the memory 416 may include an operating system 426, one or more data stores 428 and/or one or more application programs, modules, or services for implementing the features disclosed herein, including a query contextualizing and searching service module 230.

Figure 5:
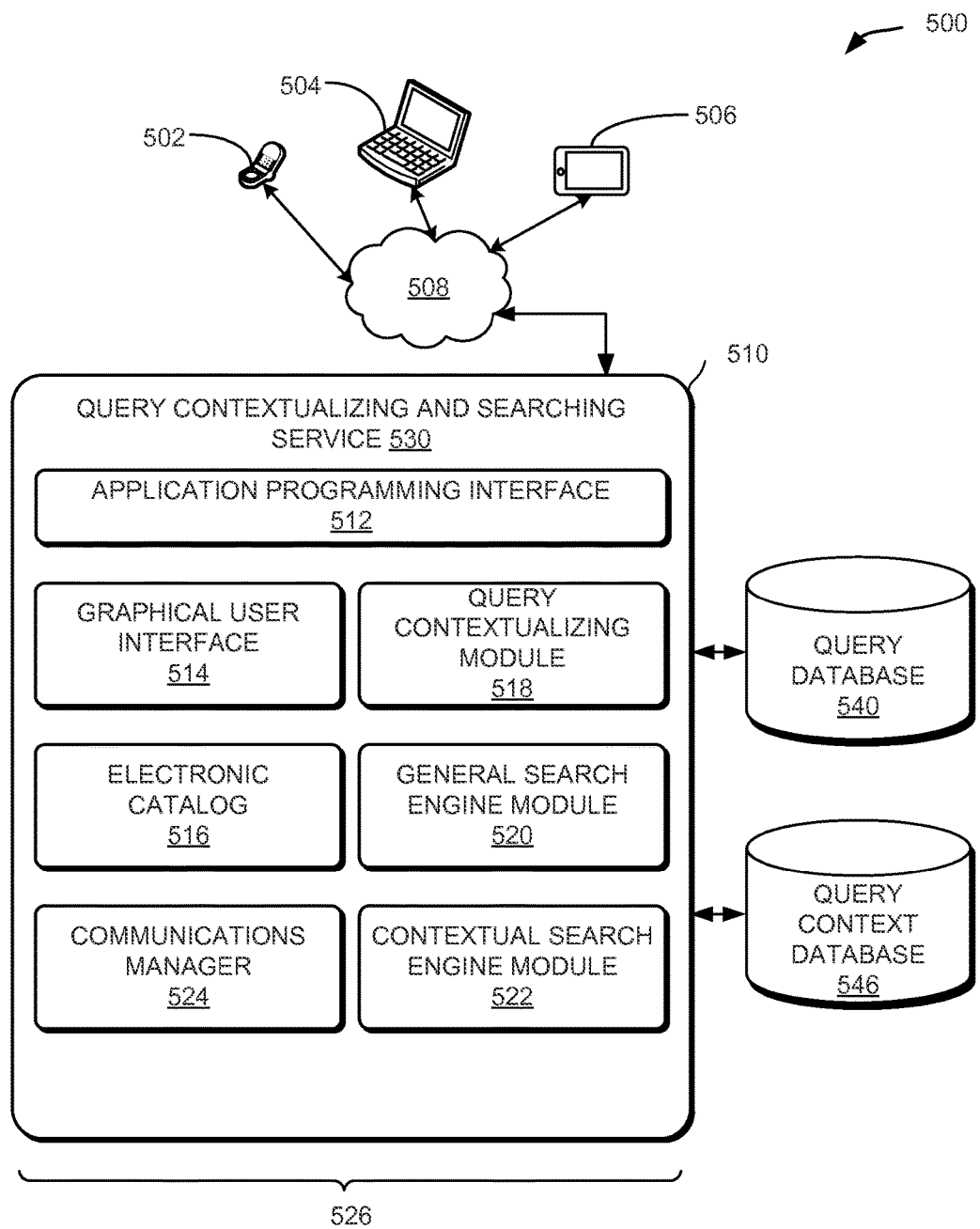
FIG. 5 illustrates further details of an example architecture for implementing a query contextualizing and searching service described herein, according to at least one other example.

FIG. 5 illustrates an example architecture 500 of a query contextualizing and searching service, provided in the context of an electronic marketplace 510, in accordance with at least one embodiment of the present disclosure. The query contextualizing and searching service 530 may include a plurality of modules configured to implement functionality of the query contextualizing and searching services, described herein. The modules 526 may be software modules, hardware modules, or a combination thereof. If the modules 526 are software modules, the modules 526 can be embodied on a computer readable medium and processed by a processor in any of the computer systems described herein. It should be noted that any module or data store described herein, may be, in accordance with at least one embodiment, a service responsible for performing at least part of a multi-index search as described herein. The modules may be configured in the manner suggested in FIG. 5 or may exist as separate modules or services external to the electronic marketplace 510.

In accordance with at least one embodiment, a user may enter and submit search terms into a search query interface via an electronic device communicating with a network 508. The network 508 may be the same or similar as the networks 408 and 110 described above. The electronic device may include, for example, a cell phone 502, a laptop computer 504, or a tablet personal computer 506. User selections may be input by the user or other users, via one of the aforementioned various electronic devices via a web browser application on the user's device.

In accordance with at least one embodiment, the query contextualizing and searching service 530 may include a graphical user interface 514. The graphical user interface 514 may serve as the back-end component that may be configured to implement the various user interface elements that can be rendered on the user's browser application (e.g., 506) at the user devices. In accordance with at least one embodiment, the graphical user interface 514 may be configured to implement one or more user interface elements to enable users on devices 502, 504 and 506 to interact with the electronic marketplace website while searching for, browsing, or purchasing items via the electronic marketplace 510. As an example, a user may utilize a user interface element to submit a search query to the electronic marketplace. The user may utilize the user interface to view search results related to a query, various categories of information related to the query, and the like. The search query may be received by the communications manager 524 and stored in the query database 540.

In accordance with at least one embodiment, the query contextualizing and searching service 530 may include a browsable electronic catalog 516 that is accessible over the network 508 to the users of user devices 502, 504 and 506, via the electronic marketplace website. The electronic catalog 516 may include a database of information about items that may be listed by users within the electronic marketplace system. The information may typically include item IDs, item descriptions and item images provided by manufacturers or distributors of the items. In some examples, information about the items listed in the electronic marketplace system may be viewable by the users of user devices 502, 504 and 506 by browsing the electronic catalog 516 wherein each item may fully be identified within a corresponding item detail page.

In some embodiments, the query contextualizing and searching service 530 may include a query contextualizing module 518. The query contextualizing module 518 may be configured to associate a context (from among a predetermined set of possible context identifiers) to one or more queries submitted by one or more users of the electronic marketplace. In one embodiment, the query contextualizing module 518 may be configured to reference available contexts and/or context determination algorithms stored in query context database 546 and/or search query histories stored in the query database 540 to assist in the association of a particular context identifier. For example, query database 540 may be updated to include context identifiers (from those stored in query context database 546) that have already been associated with particular search terms or other indicia.

In accordance with some embodiments, the query contextualizing module may be configured to analyze search results provided by the contextual search engine module 522 (or other information not associated with the specific search results), and to associate a predefined context identifier with a specific query. The query contextualizing module 518 may also be configured to perform one or more operations to update context determination algorithms, as described herein.

In accordance with at least one embodiment, the query contextualizing and searching service 530 may include a general search engine module 520. In some examples, the general search engine module 520 may be configured to perform general searches on a first data set, such as an entire corpus of information objects accessible by the query contextualizing and searching service 530, or some predetermined subset thereof. In some examples, the general search engine module 520 may be configured to provide search results for a given query to a requesting user, the query contextualizing module 518 and/or the contextual search engine module 522.

In certain embodiments, the query contextualizing and searching service 530 may include a contextual search engine module 522. In some embodiments, the contextual search engine module 522 may be configured to maintain, implement and modify a plurality of contextual search engines with associated indices and/or ranking algorithms.

In accordance with at least some embodiments, the contextual search engine module 522 may be configured to dynamically modify the contextual search engines and/or ranking algorithms in substantially real time based on the results of individual searches. Alternatively, or in addition to such modifications, the contextual search engine module 522 may be configured to modify the contextual search engines and/or ranking algorithms based on the aggregated results of similar searches (e.g. searches associated with the same context, searches by the same user, searches that yield similar results, etc.).

Figure 6:
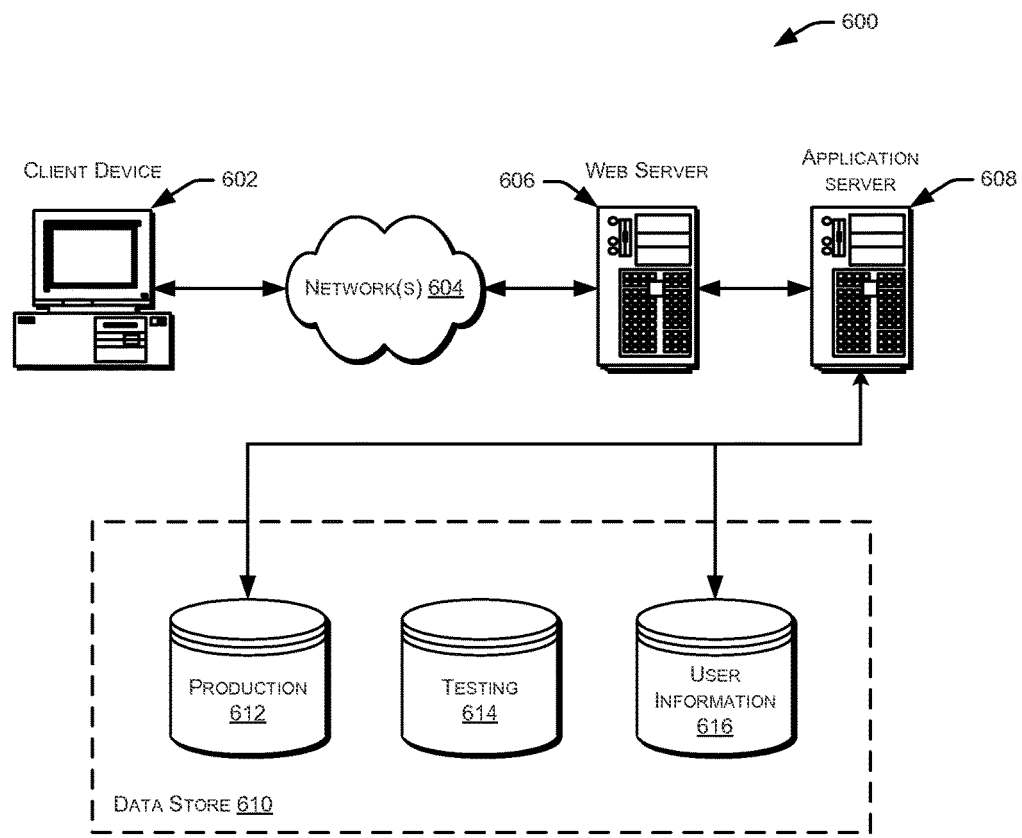
FIG. 6 illustrates an example architecture for implementing web searches as described herein, according to at least one other example.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other purposes such as those described herein. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    identifying, by a computer system, a search query including a text string;
    searching a first data set using a first search index based at least in part on the search query;
    obtaining first search results including a subset of the first data set;
    determining a context associated with the search query based at least in part on the first search results;
    identifying a second search index from among a plurality of indices based at least in part on the context associated with the search query, the plurality of indices created prior to identifying the second search index;
    searching the first search results using the second search index;
    obtaining second search results from among the subset of the first data set based at least in part on said searching the first search results using the second search index;
    ranking at least a part of the second search results with respect to each other based at least in part on a ranking algorithm of the second search index; and
    modifying the second search index based at least in part on the ranked part of the second search results,
    wherein the plurality of indices are modified at a rate that is greater than a rate at which the first search index is modified.

2. The computer-implemented method of claim 1, wherein the search query is received from a user, and wherein said determining the context associated with the search query is further based at least in part on information associated with the user.

3. The computer-implemented method of claim 1, further comprising modifying the ranking algorithm associated with the second search index based at least in part on at least one of the second search results or data that is independent of the second search results.

4. The computer-implemented method of claim 1, wherein said modifying the second search index is further based at least in part on data that is independent of the second search results.

5. The computer-implemented method of claim 1, wherein said modifying the second search index includes analyzing at least part of the second search results and modifying weighting factors included in the ranking algorithm.

6. The computer-implemented method of claim 5, wherein the second search results include document identifiers, and said analyzing at least part of the second search results includes analyzing content of documents associated with the document identifiers.

7. The computer-implemented method of claim 1, wherein said determining the context associated with the search query is further based at least in part on results of previous searches using at least one of the first search index or one of the plurality of indices.

8. The computer-implemented method of claim 1, wherein:
    determining the context associated with the search query is further based at least in part on a contextual algorithm; and
    the method further comprises modifying the contextual algorithm based at least in part on the second search results.

9. A system, comprising:
    a memory that stores computer-executable instructions; and
    a processor configured to access the memory and execute the computer-executable instructions to collectively at least:
        obtain first search results for a search query using a first search index;
        determine a second search index from among a plurality of indices based at least in part on the first search results;
        obtain second search results, from among the first search results, using the second search index;
        rank at least a part of the second search results with respect to each other based at least in part on a ranking algorithm of the second search index; and
        modify the second search index based at least in part on the ranked part of the second search results,
    wherein the plurality of indices are modified more frequently than the first search index.

10. The system of claim 9, wherein the system is further configured to modify at least one of the plurality of indices based at least in part on data that is independent of the first search results and the second search results.

11. The system of claim 9, wherein determining the second search index includes determining a context associated with the search query.

12. The system of claim 9, wherein the first search index includes a set of document identifiers, and each of the plurality of indices includes a subset of the document identifiers included in the first search index.

13. The system of claim 9, wherein at least two of the plurality of indices are associated with different ranking algorithms that are applied to the second search results.

14. The system of claim 9, wherein the system is further configured to obtain third search results using the second search index, and to modify the second search index based at least in part on the third search results.

15. A computer-readable storage device storing computer-executable instructions that, when executed by one or more computer systems, configure the one or more computer systems to perform operations comprising:
   presenting an interface for a search engine;
   receiving a search string from a user;
   searching a first data set using a first search index based at least in part on a search query that includes the search string;
   obtaining first search results including a subset of the first data set based at least in part on said searching the first data set using the first search index;
   identifying a second search index from among a plurality of predetermined indices based at least in part on the first search results;
   searching the first search results using the second search index;
   obtaining second search results from among the subset of the first data set based at least in part on the second search index;
   ranking at least a part of the second search results with respect to each other based at least in part on a ranking algorithm of the second search index;
   modifying the second search index based at least in part on the ranked part of the second search results and data that is obtained independent of the second search results; and
   transmitting the second search results to the user.

16. The computer-readable storage device of claim 15, further comprising instructions for modifying the second search index based at least in part on the second search results.

17. The computer-readable storage device of claim 15, further comprising instructions for modifying the plurality of predetermined indices based on seasonal information.

18. The computer-readable storage device of claim 17, wherein the seasonal information modifies at least one of a weighting factor or a term association within the second search index.

19. The computer-readable storage device of claim 15, wherein identifying the second search index is further based at least in part on results of previous searches using at least one of the first search index or one of the plurality of predetermined indices.

20. The computer-readable storage device of claim 15, wherein the data that is obtained independent of the second search results includes user actions from other searches using the second search index.

\* \* \* \* \*